(12) United States Patent
Fang et al.

(10) Patent No.: US 8,728,599 B2
(45) Date of Patent: May 20, 2014

(54) ARTICLES COMPRISING A HYDRATE-INHIBITING SILICONE COATING

(75) Inventors: Biao Fang, Clifton Park, NY (US); Omprakash Samudrala, Clifton Park, NY (US); Ambarish Jayant Kulkarni, Glenville, NY (US); David Bruce Hall, Ballston Lake, NY (US); Roderick Mark Lusted, Niskayuna, NY (US); Matthew David Butts, Rexford, NY (US); Shyam Sivaramakrishnan, Schenectady, NY (US); Paul Russell Wilson, Latham, NY (US); Mark Howard Giammattei, Selkirk, NY (US); Christopher Edward Wolfe, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 358 days.

(21) Appl. No.: 13/281,803

(22) Filed: Oct. 26, 2011

(65) Prior Publication Data

US 2013/0105027 A1  May 2, 2013

(51) Int. Cl.
| | |
|---|---|
| *B29D 22/00* | (2006.01) |
| *B29D 23/00* | (2006.01) |
| *B32B 1/08* | (2006.01) |
| *B32B 9/04* | (2006.01) |
| *B32B 9/06* | (2006.01) |
| *B32B 15/04* | (2006.01) |
| *F16L 11/04* | (2006.01) |
| *F16L 9/14* | (2006.01) |

(52) U.S. Cl.
CPC .............. *B29D 22/00* (2013.01); *B29D 23/00* (2013.01); *B32B 1/08* (2013.01); *B32B 9/04* (2013.01); *B32B 9/06* (2013.01); *B32B 15/04* (2013.01); *F16L 11/04* (2013.01); *F16L 9/14* (2013.01)
USPC ...... 428/36.91; 428/36.9; 428/35.8; 428/447; 428/450; 138/146

(58) Field of Classification Search
CPC .......... B29D 22/00; B29D 23/00; B32B 1/08; B32B 9/04; B32B 9/06; B32B 15/04; F16L 11/04; F16L 9/14
USPC .................... 428/36.9, 36.91, 35.8, 447, 450; 138/146
See application file for complete search history.

(56) References Cited

U.S. PATENT DOCUMENTS

| | | | |
|---|---|---|---|
| 4,856,593 A | 8/1989 | Matthews et al. | |
| 5,936,040 A | 8/1999 | Costello et al. | |
| 7,870,877 B2 | 1/2011 | McKeen et al. | |
| 7,905,290 B2 | 3/2011 | Schicks | |
| 2010/0222239 A1 | 9/2010 | Acosta et al. | |

(Continued)

FOREIGN PATENT DOCUMENTS

| | | |
|---|---|---|
| CN | 102146251 A | 8/2011 |
| EP | 923998 B1 | 4/2003 |

(Continued)

OTHER PUBLICATIONS

Search Report and Written Opinion from corresponding PCT Application No. PCT/US2013/025124 dated Jul. 11, 2013.

(Continued)

*Primary Examiner* — Michael C Miggins
(74) *Attorney, Agent, or Firm* — Andrew J. Caruso

(57) ABSTRACT

This disclosure details methods and techniques for inhibiting natural gas hydrate formation in gas conduits. In one embodiment, an article is provided which comprises (a) a gas conduit defining a gas flow channel; (b) an interior surface of the gas conduit; (c) a hydrate inhibiting coating on the interior surface, wherein the coating comprises: (i) component A, a one- or two-part room temperature vulcanizable polyorganosiloxane composition comprising a surface-treated filler, a condensation catalyst, and a crosslinking agent; and any reaction products thereof; and optionally (ii) component B, a hydrate release-enhancing proportion of at least one polyorganosiloxane comprising one or more silanol or alkoxy-silyl groups and comprising from about 10 weight percent to about 85 weight percent of at least one hydroxy-terminated or alkoxy-terminated polyoxyalkylenealkyl radical; and optionally (iii) any reaction products thereof.

35 Claims, 6 Drawing Sheets

(56) References Cited

U.S. PATENT DOCUMENTS

2011/0123736 A1   5/2011   Betting et al.
2011/0143148 A1   6/2011   Butts et al.

FOREIGN PATENT DOCUMENTS

| | | |
|---|---|---|
| JP | 2009006274 A | 1/2009 |
| WO | WO0216519 A2 | 2/2002 |
| WO | WO2010086344 A1 | 8/2010 |
| WO | 2010111226 A2 | 9/2011 |

OTHER PUBLICATIONS

"Silicones", Encyclopedia of Polymer Science and Technology, Wiley, pp. 765-841, Apr. 15, 2003.

ARTICLES COMPRISING A HYDRATE-INHIBITING SILICONE COATING

FIELD OF THE INVENTION

The invention includes embodiments that relate to coated articles. More particularly, the invention includes embodiments that relate to gas conduits having a hydrate-inhibiting coating composition on an interior surface of the gas conduit.

BACKGROUND OF THE INVENTION

Natural gas hydrates, also referred to as clathrates, are ice-like structures comprising methane or other small molecules (e.g. $CO_2$, $H_2S$, ethane, . . . ) trapped within a lattice formed by water molecules. A variety of structures for such natural gas hydrates have been proposed and are typically depicted as dodecahedrane- and larger polyhedral-based structures. Natural gas hydrates are abundant in nature and represent a potentially important source of hydrocarbons for human development.

Naturally occurring natural gas hydrates are found in sea floor sediments at depths where the ambient pressure is high and methane and water are abundant. Natural gas hydrates have also been identified in terrestrial sediments in the world's polar regions, for example the Mackenzie river delta in the Canadian Arctic.

Curiously, natural gas hydrates are found both to form and to be stable under a range of conditions at temperatures above the melting point of pure ice, particularly at elevated pressure. As such, natural gas hydrate formation is an impediment to the efficient transport of natural gas through pipelines and other gas conduits where natural gas at relatively high pressure together with water vapor flows at relatively low temperatures. Natural gas hydrate formation within a natural gas conduit can lead to blockage and therefore require remedial action, such as the application of heat or mechanical energy to the portions of the conduit blocked by the natural gas hydrate. In addition to loss of efficiency of natural gas transport, such hydrate remediation operations can pose significant physical risks to property and personnel.

Therefore, there exists a need for articles and techniques which may be implemented to mitigate the effects of natural gas hydrate formation within natural gas conduits.

BRIEF SUMMARY OF THE INVENTION

The coatings of the present invention have been found to substantially reduce the adhesion strength of model gas hydrates (synthetic hydrates comprising methane and water) to the surface of coated parts. Furthermore, the coatings exhibit significant structural integrity, a property useful in natural gas conduits in which abrasive particulate matter moving at high velocities may at times be present. The coated articles provided by the present invention are expected to be resistant to other harsh environmental factors including extremes of heat, cold and humidity, all of which can have an impact on the durability of a coating.

In one embodiment, the present invention provides an article comprising (a) a gas conduit defining a gas flow channel; (b) an interior surface of the gas conduit; (c) a hydrate inhibiting coating on the interior surface, wherein the coating comprises: (i) component A, a one- or two-part room temperature vulcanizable polyorganosiloxane composition comprising a surface-treated filler, a condensation catalyst, and a crosslinking agent; and any reaction products thereof; and optionally (ii) component B, a hydrate release-enhancing proportion of at least one polyorganosiloxane comprising one or more silanol or alkoxy-silyl groups and comprising from about 10 weight percent to about 85 weight percent of at least one hydroxy-terminated or alkoxy-terminated polyoxyalkylenealkyl radical; and optionally (iii) any reaction products thereof.

In another embodiment, the present invention provides an article comprising: (a) a gas conduit defining a gas flow channel; (b) an interior surface of the gas conduit; (c) a hydrate inhibiting coating on the interior surface, wherein the coating comprises: (i) component C, a one- or two-part addition-curable polyorganosiloxane composition comprising a resin polymer and a crosslinking agent and any reaction products thereof, and optionally (ii) component D, a hydrate release-enhancing proportion of a hydrophilic functionality that contributes from about 0.5 weight percent to about 40 weight percent of the coating, wherein the hydrophilic functionality is covalently bound to either or both of the resin polymer and crosslinking agent; and optionally (iii) any reaction products thereof.

DETAILED DESCRIPTION OF THE INVENTION

Figure 1:
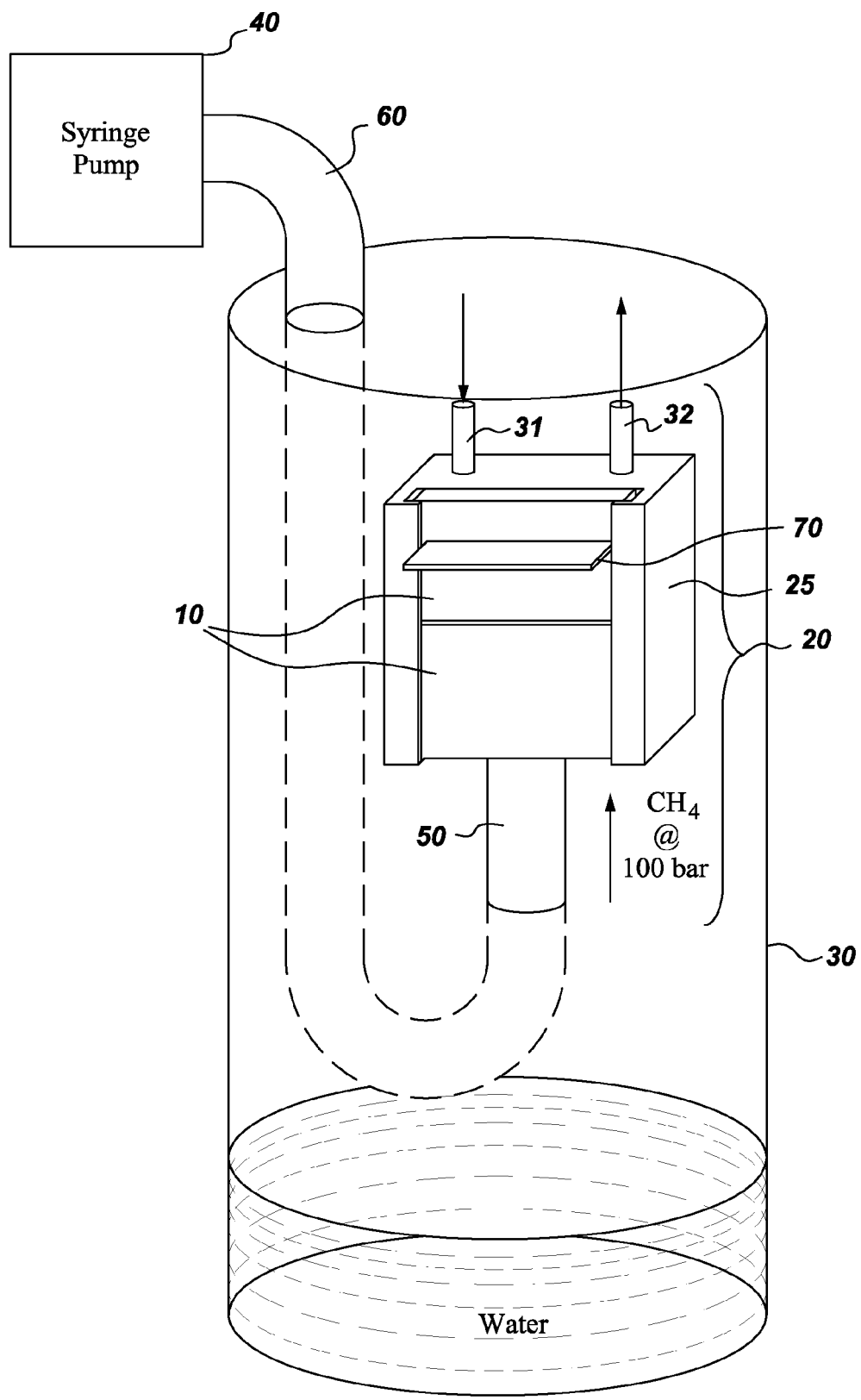
FIG. 1 illustrates a static adhesion test rig used to test the shearing adhesion strength of hydrates to coated surfaces according to one or more embodiments of the present invention.

Disclosed herein are coating compositions with gas hydrate inhibiting characteristics as well as erosion resistance and debris resistance properties. The combination of specifically defined silicone additives and curable silicone materials provides coating compositions that reduce the strength of adhesion of gas hydrates on article surfaces, for example the interior surface of a gas conduit. In some embodiments, the coating compositions are particularly useful in protecting one or more surfaces susceptible to hydrate formation, including the surfaces of conduits used to transport and/or treat natural gas. As used herein, the term "hydrate inhibiting" refers to the resistance to buildup of gas hydrates on a surface exposed to a gas-water mixture susceptible to hydrate formation. Gas-water mixtures susceptible to hydrate formation include mixtures of an organic gas such as methane and water, or a mixture of a methane-containing gas such as natural gas and water. As will be appreciated by those of ordinary skill in the art, gas hydrates may form when an organic gas or mixture of organic gases is subjected to higher than atmospheric pressure at relatively low temperature in the presence of water. For example, hydrate formation is known to occur when methane gas is compressed at about 30 bar in the presence of water at a temperature of 4 to 5 degrees centigrade. The term "erosion resistant" refers to resistance to erosion induced by the contact of a surface with solid or liquid particles. In one or more embodiments, the articles provided by the present invention are said to be weather resistant, in that hydrate inhibiting coatings comprised by the articles may be resistant to degradation by environmental factors associated with the weather, including extreme temperatures, and sunlight.

In one embodiment, the "hydrate inhibiting" effect of the hydrate inhibiting coating appears to be due to a reduction of the adhesion strength of gas hydrates to a surface susceptible to hydrate formation, e.g. a reduction in the shear force required to remove the gas hydrate from the surface. In various embodiments, the surface susceptible to hydrate formation is an interior surface of a gas conduit. As used herein the term "gas conduit" refers to any component of a gas transportation or gas containment vessel having a surface susceptible during operation to contact with the gas being transported or contained. As such the term gas conduit may refer both to gas conduits such as pipes and valves through which a gas may be actively transported (active conduits), as well as to gas conduits through which a gas ultimately passes but which serve primarily to contain a gas (static conduits), such as a gas treatment vessel or a gas storage vessel. Thus, in one embodiment, the surface susceptible to hydrate formation is an interior surface of a gas treatment vessel. In another embodiment, the surface susceptible to hydrate formation is the surface of a valve within a gas conduit. In yet another embodiment, the surface susceptible to hydrate formation is a surface of a knockout pot. Those of ordinary skill in the art will understand that the various surfaces susceptible to hydrate formation can include the many different types of surfaces of equipment and components or parts of equipment that encounter conditions under which gas hydrates may form. Examples of components of gas transportation vessels and/or gas containment vessels that can be protected as disclosed herein include, but are not limited to, gas transportation pipes, gas treatment vessel sections, gas treatment vessel baffles, engine fuel lines, gas manifolds, gas valves, gas switches, in-line sensors, knockout pots, gas well Christmas trees, jumpers, spools, dead legs, and like gas conduits.

In some embodiments, it is desirable to prevent the loss of material from, or alteration of the dimensions of, a coating on an interior surface of a gas conduit through either erosion or the buildup of gas hydrates or debris thereon, so that the original shape, volume, contours and hydrate adhesion properties of the coating are most nearly preserved. The coating compositions disclosed herein as inhibiting the buildup of hydrates within a gas conduit also act to protect the interior surfaces of the gas conduit from erosion caused by particle impact and/or impingement. In one embodiment, erosion by moving particles within the gas conduit may be prevented by the presence of the hydrate inhibiting coating on the interior surface of the gas conduit. The hydrate inhibiting coating may also prevent erosion caused by liquid droplets moving within the gas conduit by preventing direct contact with the interior surface of the gas conduit. Those of ordinary skill in the art will understand that the hydrate inhibiting coating may also prevent erosion of the interior surfaces by a combination of solid particles and liquid droplets.

The word "component" is frequently employed herein to refer to a structural part, or alternatively, to designate the materials present in the compositions of the invention. Component A of the coating compositions of the invention can be a conventional one-part or two-part room temperature vulcanizable (hereinafter sometimes "RTV") composition. These are often also referred to as "moisture cure" compositions. It typically comprises at least one reactive polyorganosiloxane (hereinafter sometimes designated "silicone" for brevity), at least one condensation catalyst and at least one crosslinking agent.

The reactive silicone is most often a polydialkylsiloxane, typically of the formula:

wherein each $R^1$ is hydroxyl or

and wherein each $R^2$ is independently a hydrocarbon or fluorinated hydrocarbon radical, each $R^3$ and $R^4$ is a hydrocarbon radical, a is 0, 1 or 2 and m has a value such that the viscosity of said reactive silicone under ambient temperature and pressure conditions is up to about 160,000 centipoise. Illustrative hydrocarbon radicals are $C_{1-20}$ alkyl, $C_{6-20}$ aryl, alkylaryl, vinyl, isopropenyl, allyl, butenyl, methyl and hexenyl. An illustrative fluorinated hydrocarbon radical is 3,3,3-trifluoropropyl. Most often each $R^2$, $R^3$ and $R^4$ is alkyl or methyl. $R^1$, $R^2$, $R^3$ and $R^4$ are not hydrophilic except in the case wherein $R^1$ is hydroxyl. In one embodiment, the reactive silicone is present in the component A composition at a concentration from about 40 weight percent to about 98 weight percent. In another embodiment, the reactive silicone is present in the component A composition at a concentration from about 60 weight percent to about 98 weight percent.

It is within the scope of the invention to employ two or more reactive silicones, differing in average molecular weight. This may afford a bimodal composition having performance advantages over a simple monomodal composition.

The condensation catalyst may be any of those known to be useful for promoting condensation curing of an RTV material. Suitable catalysts include compounds of tin, zirconium, titanium and aluminum, as illustrated by dibutyltindilaurate, dibutyltindiacetate, dibutyltin methoxide, dibutyltin bis (acetylacetonate), diisopropoxidetitanium bis(acetylacetonate), titanium naphthenate, tetrabutyltitanate, and zirconium octanoate or mixtures thereof. Various salts of organic acids or mixtures of salts with such metals as lead, iron, cobalt, manganese, zinc, antimony and bismuth may also be employed, as may non-metallic catalysts such as hexylammonium acetate and benzyltrimethylammonium acetate. In one embodiment, the condensation catalyst is present in the component A composition at a concentration from about 0.01 weight percent to about 10 weight percent. In another embodiment, the condensation catalyst is present in the component A composition at a concentration from about 0.05 weight percent to about 4.0 weight percent.

As crosslinking agents, trifunctional (T) and tetrafunctional (Q) silanes are useful, the term "functional" in this context denoting the presence of a silicon-oxygen bond. They include compounds such as methyltrimethoxysilane, methyltriethoxysilane, 2-cyanoethyltrimethoxysilane, methyl triacetoxysilane, tetraethyl silicate, and tetra-n-propyl silicate. Other crosslinking agents could be ketoximinosilanes, enoxysilanes, or alkenylsilanes such as vinyl tris(methylethylketoximino)silane or vinyl triacetoxysilane. Mixtures of crosslinking agents may also be used. In one embodiment, the crosslinking agent is present in the component A composition at a concentration from about 0.10 weight percent to about 20 weight percent. In another embodiment, the crosslinking agent is present in the Component A composition at a concentration from about 1.0 weight percent to about 10 weight percent.

Component B may be present in the hydrate inhibiting coating (i.e. is an optional component of the coating) and is a silicon-containing compound comprising one or more silanol or alkoxysilyl groups and at least one hydrophilic group. The hydrophilic group may be a hydroxy- or alkoxy-terminated polyoxyalkylenealkyl radical. Said radical or radicals comprise from about 10 weight percent to about 85 weight percent of component B; that is, the molecular weight attributable to said radicals is about 10 to about 85 percent of the total molecular weight attributable to component B. In one embodiment, component B represents from about 0.1 weight percent to about 50 weight percent of the coating composition. In another embodiment, component B represents from about 0.2 weight percent to about 30 weight percent of the coating composition. Without intending to be limited by theory, suitable component B compounds are those which are theoretically capable of covalently bonding to one or more constituents of component A upon curing of the coating composition.

In some embodiments, component B comprises compounds of the formula

wherein $R^5$, $R^6$ and $R^7$ are independently defined as follows: at least one of the $R^{5,6,7}$ radicals has the formula

at least one of the $R^{5,6,7}$ radicals is a hydroxyl group or an $OR^{11}$ group; and any remaining $R^{5,6,7}$ radicals are hydrocarbon or fluorinated hydrocarbon radicals, wherein $R^8$ and each $R^9$ are independently a $C_{2-6}$ alkylene or a substituted alkylene, $R^{10}$ is hydrogen or a $C_{1-4}$ primary or secondary alkyl, and $R^{11}$ is a $C_{1-10}$ primary or secondary alkyl; n has a value such that the weight average molecular weight of the compound is in the range of about 300 to about 40,000; and z and the number of radicals of formula (IV) are defined such component B comprises from about 10 weight percent to about 85 weight percent radicals of formula (IV). The illustrative radicals for $R^{5-7}$ are the same as for $R^2$, provided that at least one of these radicals has the formula (IV) and at least one of these radicals is a hydroxyl or $OR^{11}$ group. $R^8$ and $R^9$ may be, for example, ethylene, propylene, or trimethylene. $R^{10}$ is most often hydrogen or methyl.

Illustrative examples of compounds of formula (III) are $(MeO)_3Si(CH_2)_3(OCH_2CH_2)_3OMe$, $(MeO)_3Si(CH_2)_3(OCH_2CH_2)_{6-9}OMe$ and $(MeO)_3Si(CH_2)_3(OCH_2CH_2)_{9-12}OMe$, which are all available from Gelest, Inc., as well as copolymers such as $(EtO)_3SiO(SiMe_2O)_{20}(SiMe(CH_2CH_2CH_2(OCH_2CH_2)_{12}OH)O)_5Si(OEt)_3$ and $Me_2(EtO)SiO(SiMe_2O)_{20}(SiMe(CH_2CH_2CH_2(OCH_2CH_2)_{12}OH)O)_5Si(OEt)Me_2$, with the number of repeat units being averages. Polymers of this type can be random copolymers or block copolymers.

In other embodiments, component B comprises compounds of the formula

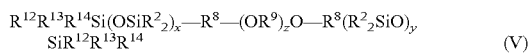

wherein at least one of the independent $R^{12}$, $R^{13}$ and $R^{14}$ groups is a hydroxyl group or an $OR^{11}$ group and any remaining $R^{12}$, $R^{13}$ and $R^{14}$ groups are independently hydrocarbon radicals, fluorinated hydrocarbons or radicals of formula (IV); $R^2$, $R^8$ and $R^9$ radicals are as defined above; and x, y and z have values such that the average molecular weight of the compound is in the range of about 400 to about 50,000 and the compound comprises at least about 5% by weight non silicone material. The illustrative hydrocarbon or fluorinated hydrocarbon radicals for $R^{12-14}$ are the same as for $R^2$.

One illustrative compound of formula (V) is bis(triethoxysilylpropyl)polyethylene oxide (comprising 25-30 ethylene oxide units) which is available from Gelest, Inc., with the catalog number SIB1824.84. More generally, the compounds employed as component B should contain radicals of formula (IV) in an amount to provide about from about 5 percent to about 80 percent by weight of the molecule.

In another embodiment, the coating composition comprises a one- or two-part addition curable polyorganosiloxane composition comprising a resin polymer and a crosslinker (at times herein referred to as a crosslinking agent), wherein the resin polymer and/or the crosslinker comprises a hydrate release-enhancing proportion of covalently bound hydrophilic functionality that contributes from about 0.5 weight percent to about 40 weight percent of the total composition; and any reaction products thereof. In some embodiments, the hydrophilic functionality comprises polyoxyalkylene radicals. In one or more embodiments the a one- or two-part addition-curable polyorganosiloxane composition comprising a resin polymer and a crosslinking agent and any reaction products thereof is referred to as Component C and the hydrate release-enhancing proportion of a hydrophilic functionality that contributes from about 0.5 weight percent to about 40 weight percent of the coating, wherein the hydrophilic functionality is covalently bound to either or both of the resin polymer and crosslinking agent is referred to as Component D. In one or more embodiments, the presence of Component D in a hydrate inhibiting coating composition comprising a one- or two-part addition-curable polyorganosiloxane composition is optional.

The addition curable coating compositions used according to the present invention comprise an alkenyl-containing polyorganosiloxane (the resin polymer), a hydride-containing polyorganosiloxane (the crosslinker), a catalytic amount of a hydrosilation catalyst and optionally an inhibitor, provided that either the alkenyl-containing polyorganosiloxane or the hydride-containing polyorganosiloxane further comprises at least one polyoxyalkylenealkyl radical of formula (VI). In some embodiments, both the alkenyl-containing polyorganosiloxane and the hydride-containing polyorganosiloxane comprise at least one polyoxyalkylenealkyl radical. The alkenyl-containing polyorganosiloxane has the general formula:

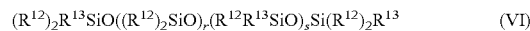

wherein at least two $R^{13}$ groups are ethylenic unsaturated radicals, for example vinyl, wherein the remaining $R^{13}$ and $R^{12}$ groups are selected from the group consisting of $C_{1-8}$ alkyl radicals, phenyl radicals and $C_{3-10}$ fluoroalkyl radicals and mixtures thereof, r+s has a value sufficient to provide a total vinyl-containing composition with a viscosity in the range between about 50 centipoise and about 500,000 centipoise at 25 degrees Celsius and a vinyl content in a range between about 0.01 weight percent and about 5.0 weight percent of the alkenyl-containing polyorganosiloxane. In one embodiment, radicals represented by $R^{12}$ are $C_{1-4}$ alkyl radicals, including for example, methyl. Typically the alkenyl-containing polymer is present in a range between about 10 weight percent and about 95 weight percent of the total addition curable composition.

The alkenyl-containing polyorganosiloxane may also include a vinyl-containing siloxane resin copolymer which may be present in a range between zero weight percent and about 70 weight percent of the total alkenyl-containing polyorganosiloxane. The vinyl-containing siloxane resin copolymer may have the formula:

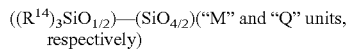

wherein each $R^{14}$ is independently either a vinyl radical or a monovalent hydrocarbon radical free of aliphatic unsaturation and containing no more than six carbon atoms, the ratio of $(R^{14})_3SiO_{1/2}$ M units to $SiO_{4/2}$ Q units being in the range of about 0.5:1 and about 1.5:1, and the resin having a vinyl content in a range between about 1.5 weight percent and about 3.5 weight percent of the vinyl containing siloxane resin copolymer. The vinyl containing siloxane resin copolymer is also referred to as a vinyl containing MQ resin or $M^{vi}Q$.

The vinyl containing siloxane resin copolymer may further contain $R^{14}SiO_{3/2}$ units (T), $(R^{14})_2SiO_{2/2}$ (D), or combinations thereof, where the $R^{14}SiO_{3/2}$ and $(R^{14})_2SiO_{2/2}$ units are present in an amount in the range between about 0 mole percent and about 10 mole percent based on the total number of moles of siloxane units in the vinyl containing siloxane resin copolymer. $R^{14}$ is defined as above.

The hydride-containing polysiloxane, which is free of aliphatic unsaturation, functions as a crosslinker and is typically present in a range between about 0.5 weight percent and about 50 weight percent based on the total weight of the addition curable composition.

In one embodiment, a hydride-containing polysiloxane has the formula

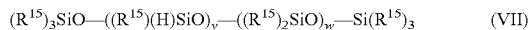

where $R^{15}$ is independently hydrogen, a monovalent hydrocarbon radical, or a halogenated monovalent hydrocarbon radical having carbon atoms in the range between about 1 and about 10; v and w have values which are sufficient when added together to provide a viscosity of the hydride-containing polysiloxane in a range between about 10 centipoise and about 50,000 centipoise at 25 degrees Celsius; and the active hydrogen content is in a range between about 0.001% and about 3% by weight of the hydrogen containing polysiloxane. $R^{15}$ may be selected from $C_{1-8}$ alkyl radicals, phenyl, $C_{3-10}$ fluoroalkyl radicals and hydrogen. The hydride-containing polysiloxane comprises at least three Si—H groups. An example of a suitable fluoroalkyl radical is trifluoropropyl. The hydrogen containing polysiloxane of formula (VII) can be used as a hydride crosslinking agent in the present formulation.

The alkenyl-containing polyorganosiloxane formula (VI) and the hydrogen containing polysiloxane formula (VII) can each comprise a radical having formula (IV) that is chemically bonded to each structure.

The coating composition also contains a hydrosilation catalyst that promotes the hydrosilation curing reaction. The hydrosilation catalyst is typically a platinum group metal, metal compound or mixtures thereof. Other catalysts include precious metals such as ruthenium, rhodium, osmium, or iridium, complexes of these metals or mixtures thereof. The hydrosilation catalyst may be a platinum containing inorganic or organometallic compound. The platinum-containing catalyst may be a platinum complex formed by allowing chloroplatinic acid containing about 4 moles of water of hydration to react with divinyltetramethyldisiloxane. This catalyst is disclosed in U.S. Pat. No. 3,775,452 and is often referred to as Karstedt's catalyst.

In one embodiment, the addition curable composition includes an inhibitor or mixture of inhibitors. Inhibitors such as acetylenic alcohols, amines, di-alkenyl maleates and di-alkenyl fumarates, tetravinyltetramethylcyclotetrasiloxane and mixtures thereof can be used in an effective amount which is typically in a range between about 0.01 weight percent and about 1 weight percent of the total composition.

The hydrate inhibiting coating compositions used in the practice of the present invention may contain other constituents such as reinforcing and extending (non-reinforcing) fillers. An example of a commercially available reinforcing filler is Aerosil® manufactured by Evonik Industries. Suitable reinforcing fillers have a primary particle size of about 5 nm to about 20 nm, and are available in the form of aggregated particles having an average size from about 50 nm to about 300 nm. Suitable fillers include silica fillers, including surface treated fumed silica and precipitated silica. In one embodiment, the silica filler employed has a surface area of from about 90 to about 325 $m^2/g$. In another embodiment, the silica filler has a surface area of from about 8 to about 150 $m^2/g$. Colloidal silica may also be used. In one embodiment, the reinforcing filler employed is a nanoparticulate silica filler.

The reinforcing filler is most often pretreated with a treating agent to render it hydrophobic. Typical treating agents include cyclic siloxanes, such as cyclooctamethyltetrasiloxane, and acyclic and cyclic organosilazanes such as hexamethyldisilazane, 1,3 divinyl-1,1,3,3,-tretramethyldisilazane, hexamethylcyclotrisilazane, octamethylcyclotetrasilazane and mixtures of these.

Non-reinforcing fillers include titanium dioxide, lithopone, zinc oxide, zirconium silicate, iron oxides, diatomaceous earth, calcium carbonate, mica, aluminum oxides, glass fibers or spheres, magnesium oxide, chromic oxide, zirconium oxide, crushed quartz, calcined clay, talc, kaolin, asbestos, carbon, graphite, cork, cotton, synthetic fibers, and carbon nanotubes. More than one type of filler may be included in the composition, for example both silica and glass may be added to a composition.

The coating compositions used according to one or more embodiments disclosed herein may also incorporate further constituents such as non-reactive silicone oils, dyes, pigments, solubilizing agents and solvents to render them sprayable if sprayability is desired. These may be introduced as part of one or more of components A-D, or as adjuvants to the entire composition, as appropriate. Suitable solvents include aromatic hydrocarbons such as toluene or xylene and aliphatic hydrocarbons such as petroleum naphtha.

In certain embodiments, the hydrate inhibiting coating compositions disclosed herein include an antioxidant. The antioxidant can be present in the coating composition in an amount between about 0.01 weight percent and about 5 weight percent based on the total weight of the coating composition. In one embodiment, the antioxidant is present in the coating composition in an amount between about 0.01 weight percent and about 2 weight percent based on the total weight of the coating composition. An example of a suitable antioxidant is 2,2'-methylene-bis(4-methyl-6-tert-butylphenol).

Hydrate inhibiting coatings compositions used according to one or more embodiments of the present invention can be applied directly to an interior surface of a gas conduit. Alternatively, the hydrate inhibiting coating may be applied to one or more other coatings that exist on the interior surface of the gas conduit such that the hydrate inhibiting coating is in fluid communication with the gas flow channel, through which, for example a mixture susceptible to hydrate formation may flow. The coatings can be applied by any method known to those skilled in the art, such as by spraying, roll coating, brush painting, doctor blading or dip or flow coating. The coating thickness after drying is typically from about 1 mil to about 200 mils.

In some embodiments, the moisture cure coating compositions employed by the present invention are applied in two or more steps. First, only component A is applied to a substrate or primed substrate, and then after a suitable amount of time, a second coat (and optionally subsequent coats) comprising both component A and component B is applied. Similarly, addition curable coatings can be prepared in two or more steps in some embodiments. For example, first component C comprising a one or two part addition curable composition devoid of any hydrophilic functionality is applied, followed by one or more coats of component D, a hydrate release-enhancing proportion of a hydrophilic functionality covalently bound to a resin polymer and or a crosslinking agent.

Experimental Part

The following examples are intended only to illustrate methods and embodiments in accordance with the invention and as such should not be construed as imposing limitations upon the claims. All AEROKRET silicone formulations were obtained from Analytical Services & Materials, Inc. (AS&M). The hydrate inhibiting coatings used in portions of this study were moisture-curable silicones. Surfaces treated with a hydrate inhibiting coating were first treated with AeroKret Primer 177, an epoxy based resin, in order to improve the adhesion of the hydrate inhibiting coating to the substrate.

Hydrate inhibiting coatings representative of those evaluated include AeroKret 9* (AK9*), a low modulus coating; AeroKret 12XS (AK12XS) an intermediate modulus coating; and AeroKret 21XS (AK21XS), a higher modulus coating. The coating compositions were purchased as solutions in xylenes.

Additionally, a coating produced by modifying AeroKret 9* with Gelest DBE-712, a low molecular weight (~600 Da) dimethylsiloxane-ethylene oxide copolymer, was evaluated. After cure, the hybrid coating comprised approximately 20 weight percent of this DBE-712 additive. This combination was found to produce substantially lower hydrate adhesion relative to the control Steel substrates used in static adhesion tests (Examples 1-3 below) were grit-blasted and primed with AK177 prior to the application of the topcoats. The primer thickness was on the order of 3 mils. The Aerokret coatings were applied to the substrates in two consecutive layers with a doctor blade. Typically, the topcoat was applied to produce a coating having a thickness of from about 15 to about 20 mils. The Aerokret coatings were allowed to cure for a minimum of 5 days prior to testing.

EXAMPLES

Examples 1-3 and Comparative Examples 1-4

The moisture cure silicone coating formulation AEROKRET 12XS (AK12XS) was applied to three pairs of primer coated (AeroKret Primer 177) steel test coupons as a solution in xylenes. The solvent evaporated and the silicone coating was allowed to cure to produce three pairs of test coupons having test surfaces coated with the hydrate inhibiting coating. A pair of the test coupons (10) was then mounted in a static adhesion test rig (20) equipped with a cooling stage (cold plate) 25 configured as in FIG. 1 and configured as shown to fit within a 450 mL pressure vessel (30) (available from Parr Instrument Company, Moline Ill.) equipped with inlets and outlets for coolant (31-32) and gas (not shown). The bottom of the pressure vessel contained water. The test rig was mounted in the pressure vessel above the level of the water, the vessel was sealed and appropriate connections were made to coolant inlet and outlet lines, to a methane gas supply line, and to a syringe pump (40) which was used to drive the test rig piston (50) via hydraulic fluid line (60). Methane gas was introduced into the pressure vessel to a pressure of about 1600 pounds per square inch (psi). Coolant was passed through the test rig to bring the surface temperature of the hydrate inhibiting coating to about 10° C. The walls of the pressure vessel were maintained at a temperature above 10° C. by heating the pressure vessel. Methane hydrate was allowed to form on the chilled surface of the hydrate inhibiting coating for a period of about 16 hours. Once a substantial hydrate coating had been formed, the piston was actuated to move the test coupons past a static blade (70) which sheared off the methane hydrate layer from the surface of the hydrate inhibiting coating. Progress of the shearing of the methane hydrate from the surface of the hydrate inhibiting coating was recorded in video images taken through a watch glass in the side of the pressure vessel. In addition, the force required to move the test coupons past the blade was recorded (See FIG. 2).

Figure 2:
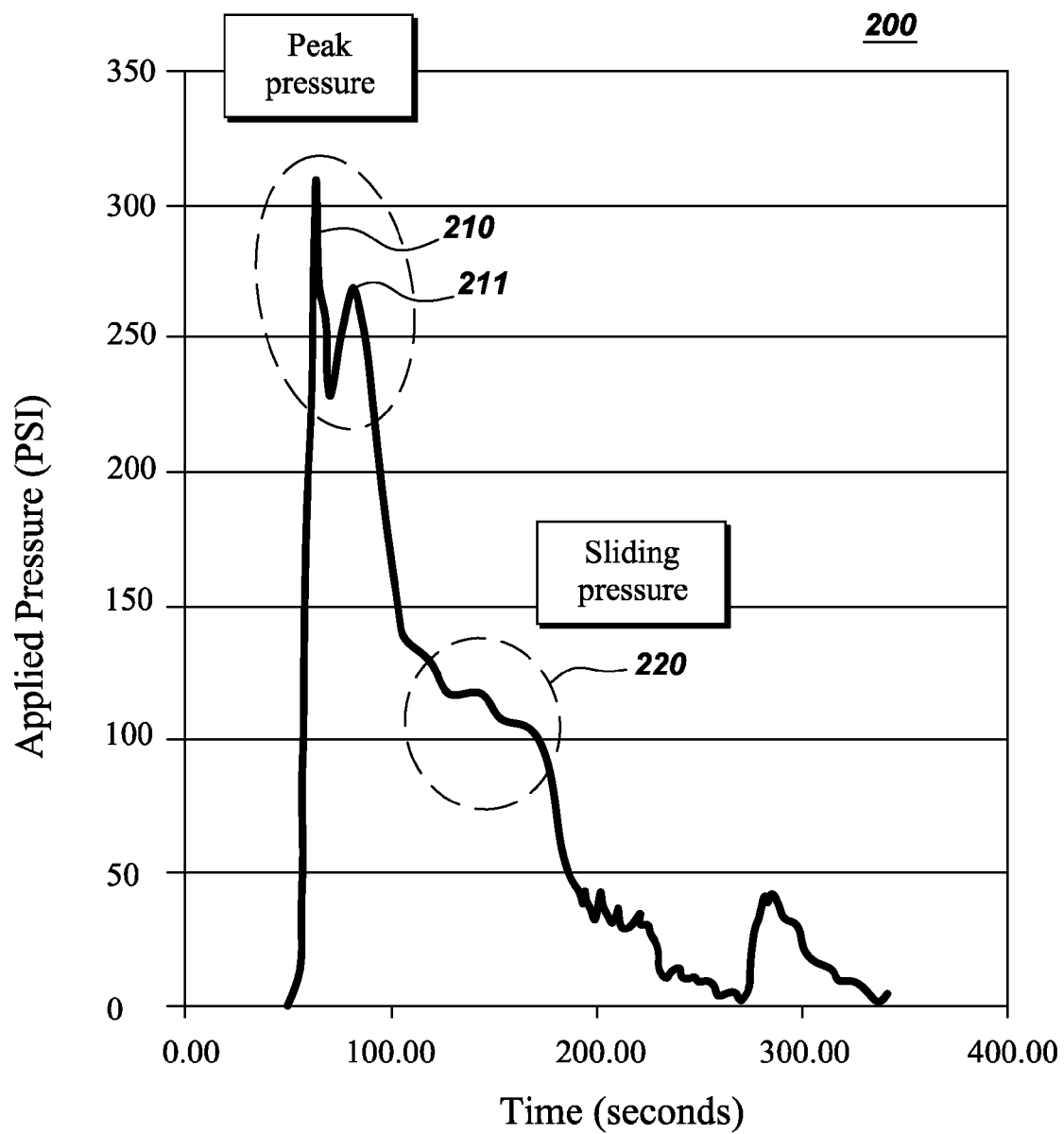
FIG. 2 illustrates the variation in applied shearing force that corresponds to performance of a hydrate inhibiting coating in the static adhesion test rig used according to one or more embodiments of the present invention.

FIG. 2 shows the pressure applied to the piston (the applied pressure) pressure as a function of time (200) with the test coupons moving at constant velocity past the static blade. The initial peaks (210) and (211) (~300 and ~270 psi respectively) represent the applied hydraulic pressure required to break hydrate bridging the metal holder portion of the test rig from the coated test coupons themselves. The first plateau (220) relates to the sliding force (and sliding pressure) required to shear hydrates from the test coupons themselves and serves as a basis for estimating the relative strength of adhesion between the methane hydrate and the hydrate inhibiting coating or untreated coupon surface from sample to sample. The sliding force is defined as the measured sliding pressure multiplied by the area of the piston.

Table 1 gathers data obtained from three pairs of test coupons comprising the hydrate inhibiting coating prepared as described above (Examples 1-3), and data obtained from 4 pairs of uncoated stainless steel test coupons (Comparative Examples 1-4, SS304). In each case the sliding force required to shear the hydrate layer from the surface of the test coupon was measured. The data illustrate the beneficial effect of the hydrate inhibiting coating in reducing the sliding force required to shear the hydrate from the surface of the test coupon. In addition, videos of hydrates being sheared away from the surface showed that complete removal of hydrates with little or no remnants was observed on the surface of AK-12 coated test coupons. On the other hand, hydrate remnants were observed to remain on the surface of untreated stainless steel test coupons after completion of shearing.

TABLE 1

| Entry | Sliding Force (lbs) | Estimated Surface Temperature (° C.) of Test Coupon |
| --- | --- | --- |
| Example 1 | 108 | 12.87 |
| Example 2 | 57 | 13.50 |
| Example 3 | 58 | 13.47 |
| Comparative Example 1 | 352 | 10.72 |
| Comparative Example 2 | 152 | 13.87 |
| Comparative Example 3 | 220 | 11.73 |
| Comparative Example 4 | 162 | 12.76 |

Example 4

Preparation of A Hydrate Inhibiting Coating Comprising an Addition-Curable Polyorganosiloxane The preparation of an addition curable composition comprising covalently bound polyoxyalkylenealkyl radicals is illustrated. The silicone polymer $Me_3Si(OSiHMeO)_{15}(OSiMe_2)_{185}OSiMe_3$ (15.0 g, 0.001015 moles), polyglycol AM350 (2.49 g, 0.0071 moles, Clariant, $CH_2CHCH_2(OCH_2CH_2)_6Me$), 5 weight percent platinum on alumina (1.2 g), and isopropanol (121 mL) were combined in a 250 mL round bottom flask. The solution was stirred with a magnetic stir bar and heated to 70 degrees Celsius for 18 hours. The reaction mixture was cooled to room temperature. The platinum on alumina was removed by filtration through a 0.45 micron filter. Hexamethyldisilazane-treated silica gel (2.2 g, Gelest Inc.) was mixed into the solution and the volatiles were removed under reduced pressure. The resulting oil was mixed with the silicone polymer $(vinyl)Me_2Si(OSiMe_2)_{20}OSiMe_2(vinyl)$ (6.78 g, 0.00406 moles), 2,2'-methylenebis(6-tertbutyl-4-methylphenol) (0.0311 g) and platinum catalyst 89023 (0.019 g, Momentive Performance Materials). The coating could be applied to the interior surface of a gas conduit cured at 60 degrees Celsius for 4 hours to provide an article comprising the hydrate inhibiting coating. Coatings such as the one depicted in this Example may at times be referred to as "pegylated-addcure" coatings.

Example 5

Preparation of an Addition Curable Composition not Comprising Polyoxyalkylenealkyl Radicals The silicone polymer $Me_3Si(OSiHMeO)_{15}(OSiMe_2)_{185}OSiMe_3$ (15.0 g, 0.001015 moles), vinyltrimethyl silane (0.71 g, 0.0071 moles), 5 weight percent platinum on alumina (1.2 g), and isopropanol (121 mL) were mixed in a 250 mL round bottom flask. The solution was stirred with a magnetic stir bar and heated to 70 degrees Celsius for 18 hours. The reaction mixture was then cooled to room temperature. The platinum on alumina was removed by filtration through a 0.45 micron filter. Hexamethyldisilazane-treated silica gel (2.2 g, Gelest Inc.) was mixed into the solution and the volatiles were removed under vacuum. The resulting oil was mixed with the silicone polymer $(vinyl)Me_2Si(OSiMe_2)_{20}OSiMe_2(vinyl)$ (6.78 g, 0.00406 moles) and platinum catalyst 89023 (0.019 g, Momentive Performance Materials). An article comprising a hydrate inhibiting coating could be prepared by applying the coating onto a primed interior surface of a gas conduit and thereafter curing the coating at 60 degrees Celsius for 4 hours. The coating described in this Example is at times referred to as a "non-pegylated-addcure" coating.

Comparative Example 5 and Examples 6-7 Flow System Hydrate Inhibition Tests

Figure 3:
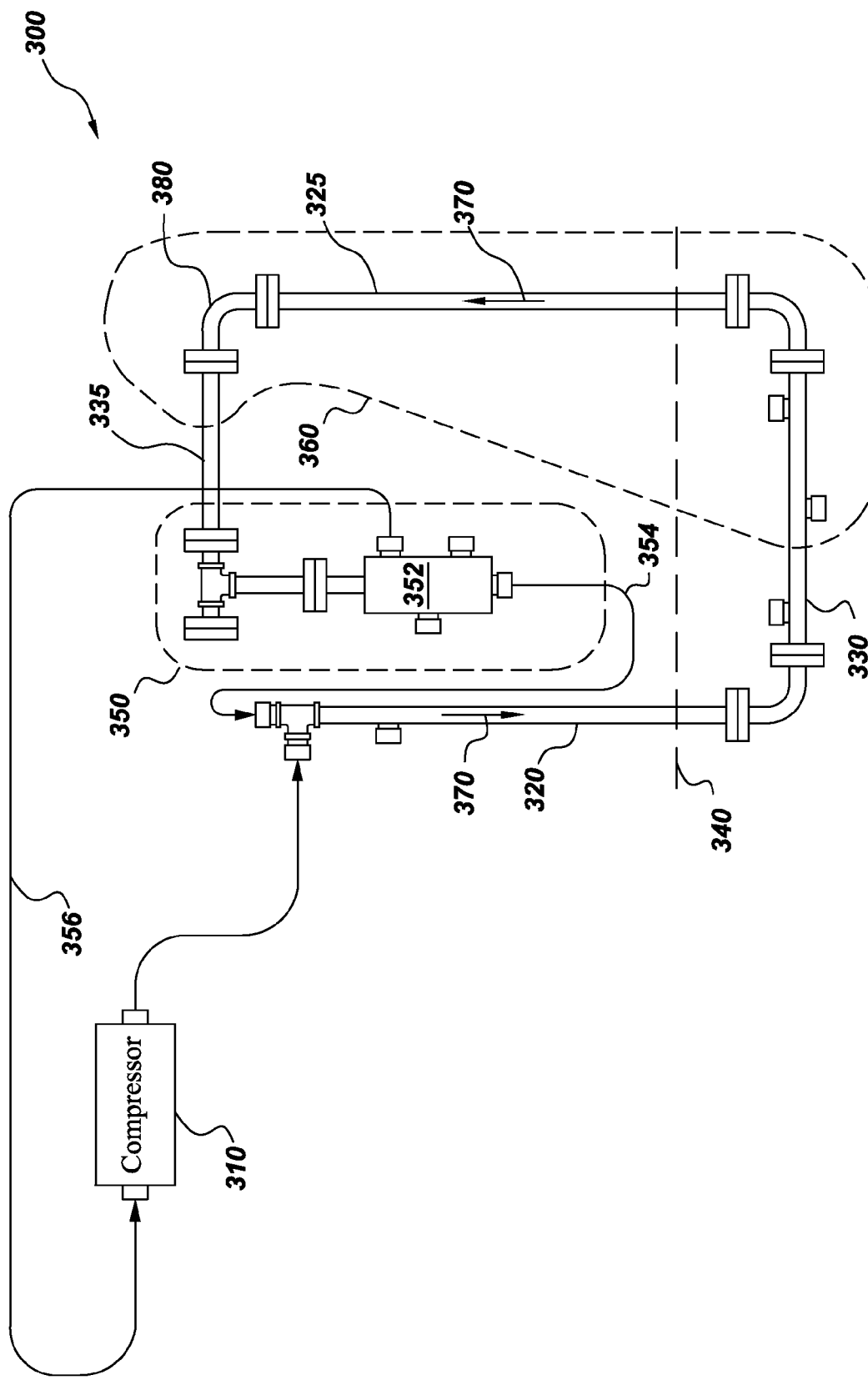
FIG. 3 illustrates a flow closed loop test rig used to test adhesion of hydrates to coatings in a flowing gas environment according to one or more embodiments of the present invention.

A first flow closed loop test rig (300) was constructed and is illustrated in FIG. 3. The test rig was configured such that methane gas could be circulated via an in-line compressor (310) through the closed-loop gas conduit system shown as comprising two relatively long vertical gas conduit sections (320) and (325) (60 and 70 inches long respectively), and lower and upper horizontal gas conduit sections (330) and (335) roughly half that length. Horizontal and vertical gas conduit sections were configured to be orthogonal to adjacent gas conduit sections and parallel to opposite gas conduit sections. The closed-loop test rig comprised liquid water which prior to actuating the compressor entirely filled the lower horizontal section and a portion of the vertical gas conduit sections as indicated by water level (340).

In practice, water was first added to the test rig through a water inlet valve. Thereafter, methane gas was introduced into the closed loop system to a pressure of about 1600 psi. The in-line compressor was then started and the headspace gas was circulated through the loop during which circulation the headspace gas comprised initially chiefly of methane passed through the liquid water. Test rig (300) comprised a heated section (350) and a cooled section (360). The heated section comprised a Knockout pot (352) a water return line (354) and water pump (not shown) to return water from the knockout pot to the horizontal gas conduit section (330). The heated knockout pot (352) was configured to capture hydrate particles and water droplets impelled through the system by the flowing headspace gas (370) comprised chiefly of methane and water vapor. Because the knockout pot was heated, methane hydrate particles (not shown) were converted back to liquid water and gaseous methane. The liquid water could be transferred at need from the knockout pot to the liquid water in the lower sections of the flow loop via water return line (354), and the gaseous methane was allowed to return via gas return line (356) to the headspace gas being circulated by the in-line compressor (310). The cooled section (360) comprised portions of horizontal sections (330) and (335) and all of right vertical section (325) and was maintained at a temperature sufficiently low to permit methane hydrate formation.

Closed loop test rig (300) was equipped with 24 thermocouples (2 internal and 22 external, not shown), three pressure sensors (not shown), and 1 flowmeter (not shown). The flow loop test rig was further equipped with six independently operable external heating elements (not shown) so that in the event of hydrate plug formation, its location could be ascertained by systematic heating of test rig sections and observing the effect of the heating on flow rate and the differential pressure (dP) across the in-line compressor (310).

Figure 4:
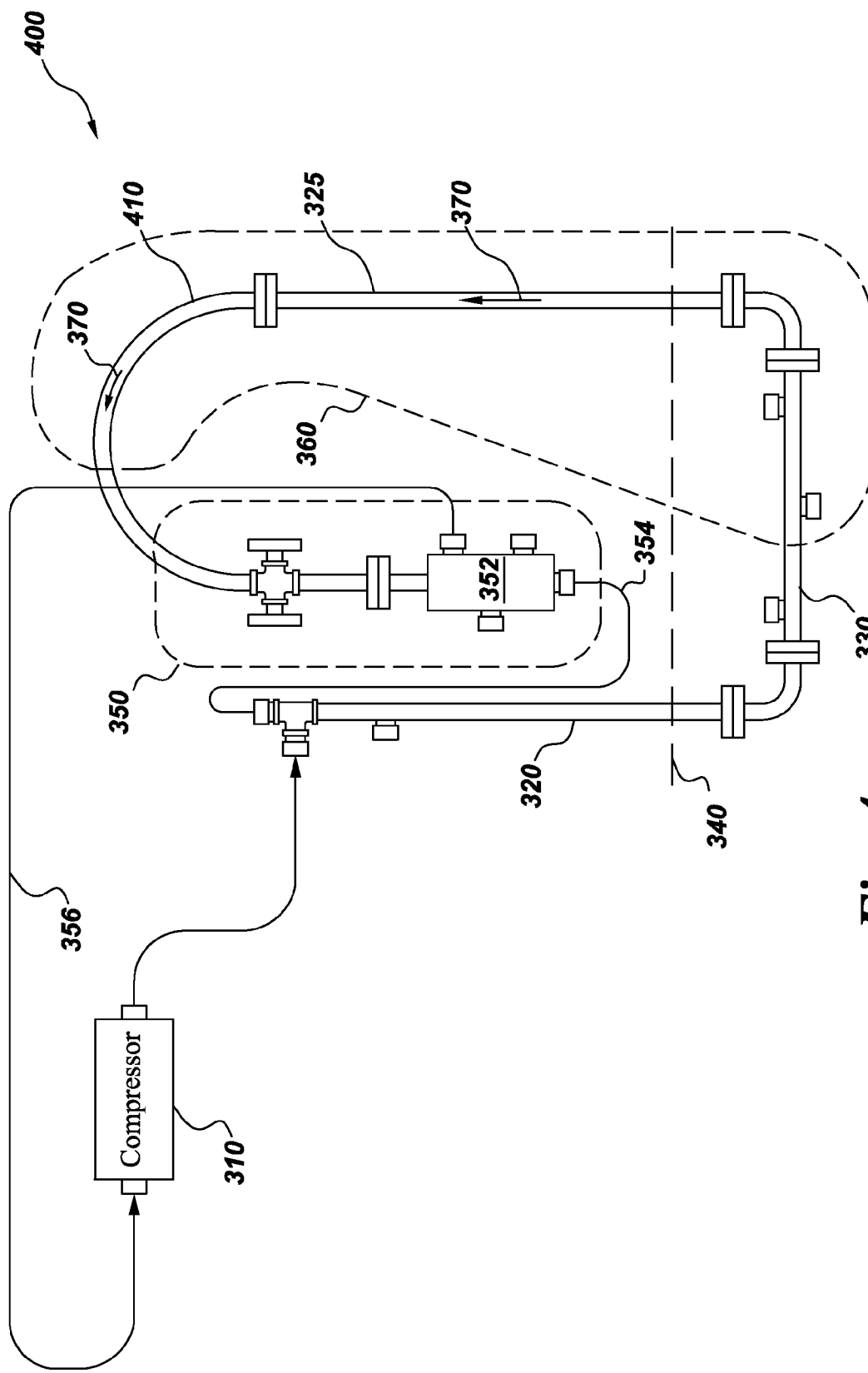
FIG. 4 illustrates an alternate configuration of a flow closed loop test rig used according to one or more embodiments of the present invention.

Two experiments were run using the flow closed loop test rig configured as in FIG. 3. In the first of these experiments, referred to here as Comparative Example 5, no interior surfaces of the gas conduit sections were treated with the hydrate inhibiting coating. In the second of these experiments, referred to here as Example 4, the interior surfaces of 3 elbow sections, one of the vertical sections, and two of the horizontal sections were coated with a hydrate inhibiting coating comprising AeroKret 12XS. A third Experiment, referred to here as Example 5, was carried out using the flow closed loop test rig (400) as shown in FIG. 4 in which a 180 degree bend gas conduit section (410) was substituted for upper horizontal gas conduit section (335) in test rig (300). Test rig (400) included the gas conduit sections comprising the hydrate inhibiting coating comprising AeroKret 12XS on the interior surfaces as in Example 4. In addition gas conduit section (410) also comprised the same hydrate inhibiting coating on the gas conduit interior surface. In test rig (400), the cooled section (360) included at least a portion of gas conduit section (410). Knockout pot (352) remained in heated section (350). Replacement of gas conduit section (335) and the associated upper-right elbow section (380) was motivated by experimental findings that hydrate plugs tended to accumulate at elbow section (380) in preference to other areas within the flow closed loop test rig (300).

In each of Examples 4 and 5 and Comparative Example 5, an initial flow rate of 100 grams per minute was established and then the flow rate was raised to 200 grams per minute. The system was operated until hydrate plug formation was evident at 10 bar pressure and the time recorded. Data are gathered in Table 2 and show the beneficial and dramatic effect of the hydrate inhibiting coating on rate of plug formation.

TABLE 2

| Entry | Time to Hydrate Plug Formation (minutes) |
|---|---|
| Comparative Example 5 | 35 |
| Example 4 | 90 |
| Example 5 | 285 |

Figure 5:
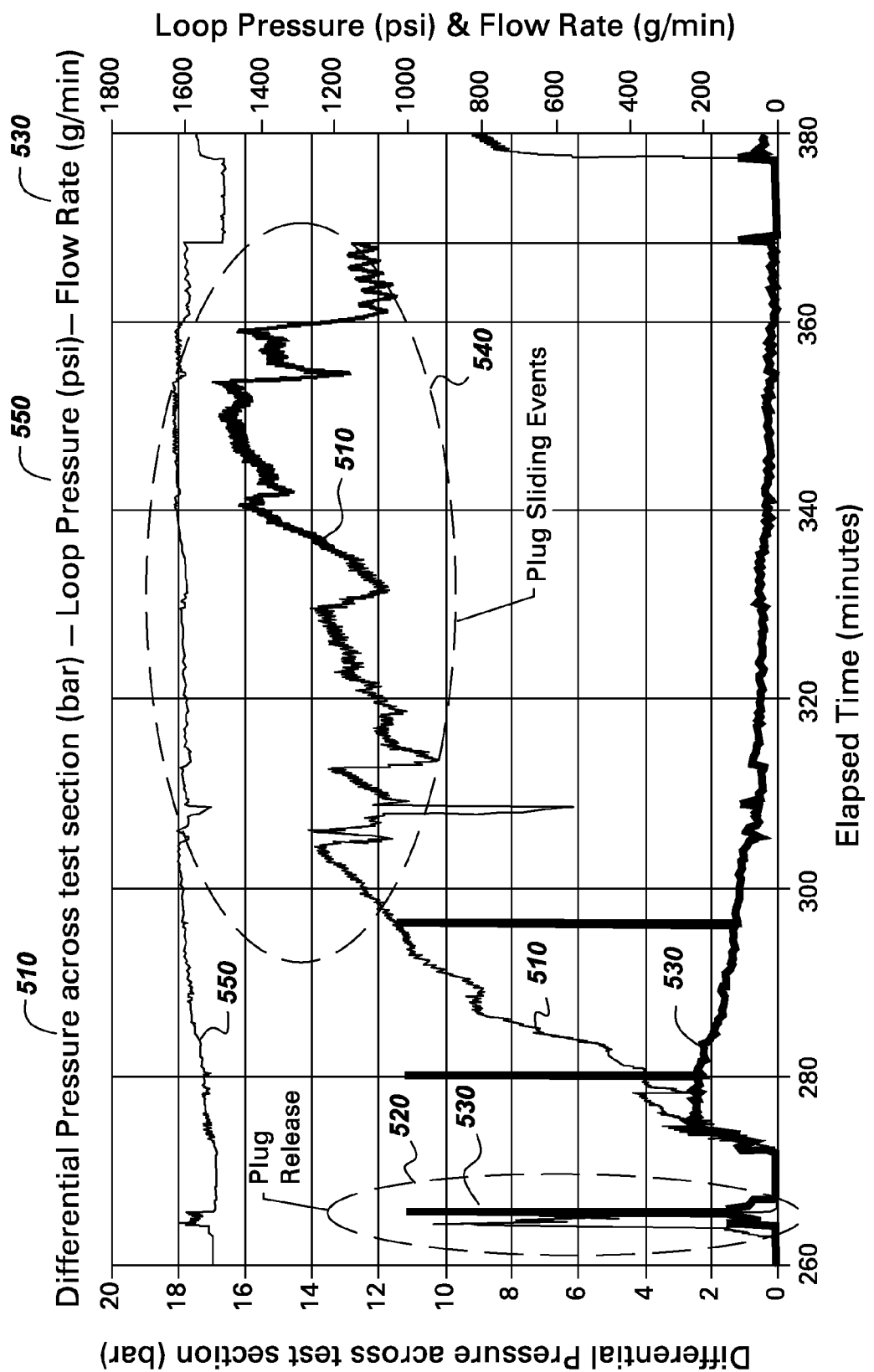
FIG. 5 illustrates performance data obtained from a flow closed loop test rig used according to one or more embodiments of the present invention.
Figure 6:
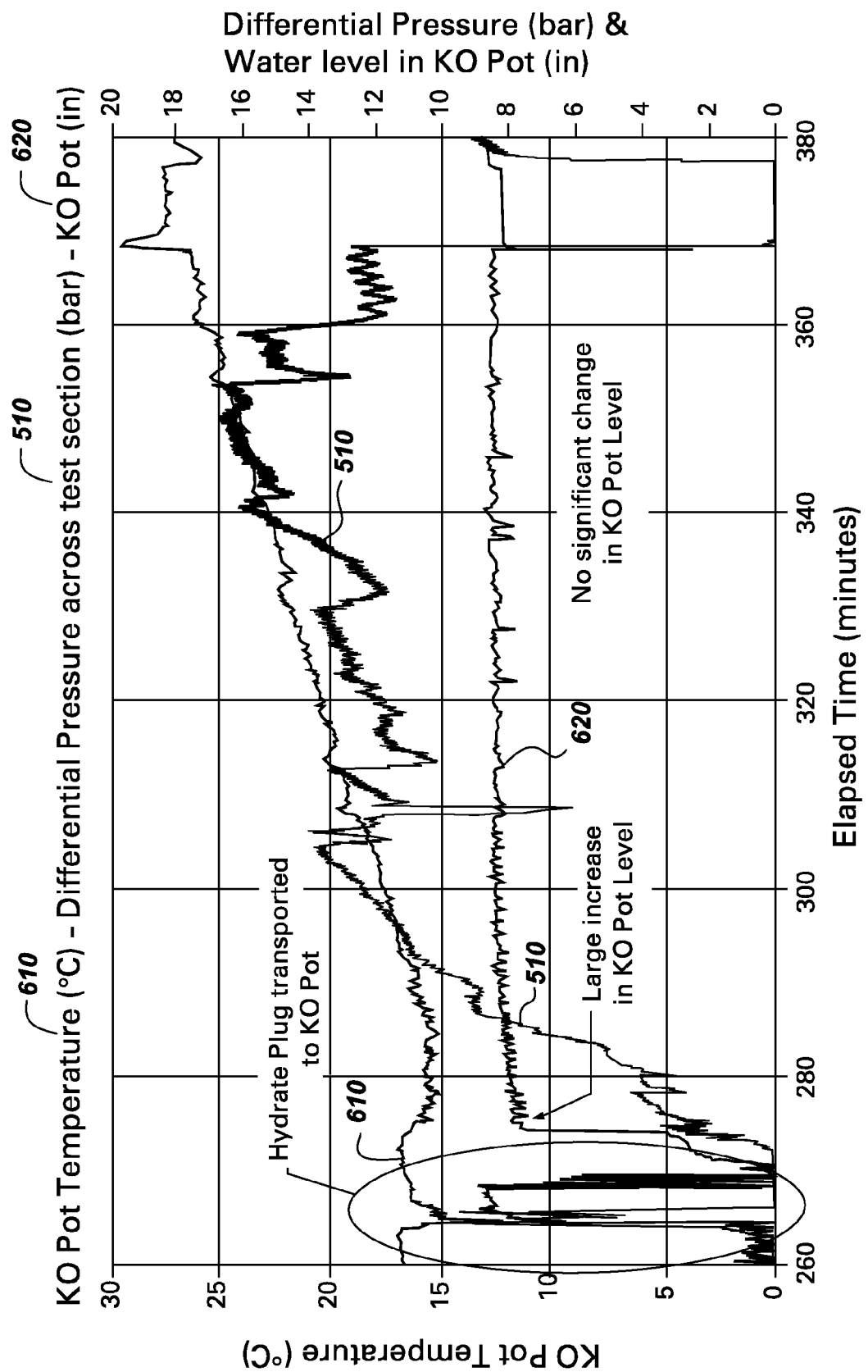
FIG. 6 illustrates performance data obtained from a flow closed loop test rig used according to one or more embodiments of the present invention.

Additional details are provided for Example 5 in FIGS. 5 and 6. In Example 5 a substantial and persistent plug was observed to have formed after about 280 minutes of operation of the test rig shown in FIG. 4 as indicated by a gradual increase in the differential pressure (510) across the compressor. It is noteworthy that a substantial plug was observed to form and be released at about 265 minutes of operation. This plug release event (520) was marked by a sharp increase in flow rate (530) and recovery to about 200 grams per minute before dropping off again with the onset of formation the persistent plug. Notwithstanding the persistence of the methane hydrate plug, a series of plug sliding events (540) were observed between about 300 minutes and about 360 minutes of operation, suggesting movement of one or more plugs toward the top elbow during the experiment. Loop pressure as a whole (550) was relatively constant during the period, however, both the plug release event (520) and plug sliding events were discernable as fluctuations in loop pressure.

FIG. 6 provides additional insights into plug release event (520). These were discernable by monitoring the temperature (610) and the liquid level (620) in the knockout pot (352). Both a reduction in temperature and an increase in liquid level in the knockout pot occurred in concert with the plug release event (520), suggesting that at least a portion of the methane hydrate plug released was impelled by the moving headspace gas to the knockout pot. It is also noteworthy that sliding events (540) do not appear to have involved transport of any significant amount of hydrate to the knockout pot since the level of fluid (620) in the knockout pot remained essentially constant following plug release (520) and the temperature (610) of the contents of the knockout pot gradually increased as would be expected if no additional hydrate were added.

All ranges disclosed herein are inclusive of the endpoints, and the endpoints are combinable with each other. The terms "first," "second," and the like as used herein do not denote any order, quantity, or importance, but are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with a number of embodiments, the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An article comprising:
   (a) a gas conduit defining a gas flow channel;
   (b) an interior surface of the gas conduit;
   (c) a hydrate inhibiting coating on the interior surface, wherein the coating comprises:
      (i) component A, a one- or two-part room temperature vulcanizable polyorganosiloxane composition comprising a surface-treated filler, a condensation catalyst, and a crosslinking agent; and any reaction products thereof; and optionally
      (ii) component B, a hydrate release-enhancing proportion of at least one polyorganosiloxane comprising one or more silanol or alkoxysilyl groups and comprising from about 10 weight percent to about 85 weight percent of at least one hydroxy-terminated or alkoxy-terminated polyoxyalkylenealkyl radical; and optionally
      (iii) any reaction products thereof.

2. The article of claim 1, wherein the condensation catalyst comprises a compound of tin, zirconium, titanium or aluminum.

3. The article of claim 1, wherein the crosslinking agent is a trifunctional or tetrafunctional silane.

4. The article of claim 1, wherein the surface treated filler is a surface treated fumed silica.

5. The article of claim 1, wherein the gas conduit is part of a natural gas delivery system.

6. The article of claim 1, wherein the article is a section of pipe configured for use in a natural gas delivery system.

7. The article of claim 1, wherein the article is a knock out pot configured for use in a natural gas delivery system.

8. The article of claim 1, wherein the hydrate inhibiting coating comprises at least one reactive silicone.

9. The article of claim 8, wherein the reactive silicone comprises a polydialkylsiloxane having the formula $$R^1(SiR^2R^2O)_m SiR^2R^2R^1 \qquad (I)$$

wherein each $R^1$ is hydroxyl or $$-O-Si(R^3)_a-(OR^4)_{3-a} \qquad (II)$$

and wherein each $R^2$ is independently a hydrocarbon or fluorinated hydrocarbon radical, each $R^3$ and $R^4$ is a hydrocarbon radical, a is 0, 1 or 2 and m has a value such that the viscosity of said reactive silicone under ambient temperature and pressure conditions is up to about 160,000 centipoise.

10. The article of claim 9, wherein each $R^2$, $R^3$ and $R^4$ is methyl.

11. The article of claim 1, wherein the hydrate inhibiting coating comprises component B.

12. The article of claim 11, wherein the hydrate release-enhancing proportion comprises one or more compounds having the formula $$R^5(SiR^6R^7O)_n SiR^6R^7R^5 \qquad (III)$$

wherein at least one of the $R^{5,6,7}$ radicals has the formula $$-R^8-(OR^9)_z-OR^{10}; \qquad (IV)$$

wherein at least one of the $R^{5,6,7}$ radicals is a hydroxyl group or an $OR^{11}$ group and any remaining $R^{5,6,7}$ radicals are hydrocarbon or fluorinated hydrocarbon radicals; $R^8$ and each $R^9$ are a $C_{2-6}$ alkylene or a substituted alkylene; $R^{10}$ is hydrogen or a $C_{1-4}$ primary or secondary alkyl, and $R^{11}$ is a $C_{1-10}$ primary or secondary alkyl; n has a value such that the weight average molecular weight of the compound is in a range of about 300 to about 40,000; and z and the number of radicals of formula (IV) are defined such that the hydrate release-enhancing proportion comprises from about 10 weight percent to about 85 weight percent radicals of formula (IV).

13. The article of claim 12, wherein $R^8$ and $R^9$ are ethylene, propylene, or trimethylene.

14. The article of claim 12, wherein $R^{10}$ is hydrogen or methyl.

15. The article of claim 11, wherein component B comprises one or more compounds of the formula

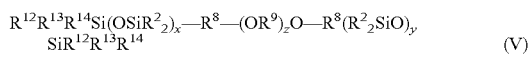

wherein at least one of the $R^{12}$, $R^{13}$ and $R^{14}$ groups is a hydroxyl group or an $OR^{11}$ group and any remaining $R^{12}$, $R^{13}$ and $R^{14}$ groups are a hydrocarbon radical, a fluorinated hydrocarbon or a radicals of formula IV; wherein each $R^2$ a hydrocarbon or fluorinated hydrocarbon radical, wherein $R^8$ and $R^9$ are independently a $C_{2-6}$ alkylene or a substituted alkylene; and x, y and z have values such that the average molecular weight of the compound is in the range of about 400 to about 50,000 and the compound comprises at least about 5% by weight of non silicone material.

16. The article of claim 11, wherein component B is present in the coating composition in an amount of about 0.1 weight percent to about 50 weight percent.

17. The article of claim 1, wherein the coating further comprises an antioxidant.

18. The article of claim 17, wherein the antioxidant is present in an amount between about 0.01 weight percent and about 5 weight percent based on the total weight of the coating.

19. The article of claim 17, wherein the antioxidant comprises 2,2'-methylene-bis(4-methyl-6-tert-butylphenol).

20. An article comprising:
(a) a gas conduit defining a gas flow channel;
(b) an interior surface of the gas conduit;
(c) a hydrate inhibiting coating on the interior surface, wherein the coating comprises:
  (i) component C, a one- or two-part addition-curable polyorganosiloxane composition comprising a resin polymer and a crosslinking agent and any reaction products thereof, and optionally
  (ii) component D, a hydrate release-enhancing proportion of a hydrophilic functionality that contributes from about 0.5 weight percent to about 40 weight percent of the coating, wherein the hydrophilic functionality is covalently bound to either or both of the resin polymer and crosslinking agent; and optionally
  (iii) any reaction products thereof.

21. The article of claim 20, wherein the hydrophilic functionality comprises a polyoxyalkylenealkyl radical.

22. The article of claim 20, wherein the hydrate inhibiting coating further comprises a reinforcing or non-reinforcing filler.

23. The article of claim 20, wherein the hydrate inhibiting coating comprises component D.

24. The article of claim 20, wherein the addition curable composition comprises an alkenyl-containing polyorganosiloxane, a hydride-containing polyorganosiloxane, a hydrosilation catalyst, and an inhibitor.

25. The article of claim 24, wherein the alkenyl-containing polyorganosiloxane has the formula

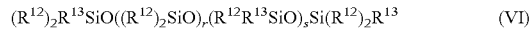

wherein at least two $R^{13}$ groups are an ethylenic unsaturated radical, wherein the remaining $R^{13}$ and $R^{12}$ are selected from the group consisting of $C_{1-8}$ alkyl radicals, phenyl radicals and $C_{3-10}$ fluoroalkyl radicals and mixtures thereof, r+s has a value sufficient to provide a total vinyl-containing composition with a viscosity in the range between about 50 centipoise and about 100,000 centipoise at 25 degrees Celsius and a vinyl content in a range between about 0.01 weight percent and about 4.0 weight percent of the alkenyl-containing polyorganosiloxane.

26. The article of claim 25, wherein each $R^{12}$ is a $C_{1-4}$ alkyl radical.

27. The article of claim 24, wherein the alkenyl-containing polyorganosiloxane comprises a vinyl-containing siloxane resin copolymer having the formula

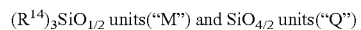

wherein each $R^{14}$ is independently a vinyl radical or a monovalent hydrocarbon radical free of aliphatic unsaturation and containing no more than six carbon atoms, the ratio of $(R^{14})_3SiO_{1/2}$ M units to $SiO_{4/2}$ Q units being in the range of about 0.5:1 and about 1.5:1, and the resin having a vinyl content in a range between about 1.5 weight percent and about 3.5 weight percent of the vinyl containing siloxane resin copolymer.

28. The article of claim 24, wherein the hydride-containing polysiloxane has the formula

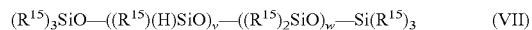

where $R^{15}$ is independently hydrogen, a monovalent hydrocarbon radical, or a halogenated monovalent hydrocarbon radical having carbon atoms in the range between about 1 and about 10; v and w have values which are sufficient when added together to provide a viscosity of the hydride-containing polysiloxane in a range between about 10 centipoise and about 50,000 centipoise at 25 degrees Celsius.

29. The article of claim 28, wherein each $R^{15}$ is independently a $C_{1-8}$ alkyl radical, phenyl, a $C_{3-10}$ fluoroalkyl radical, or hydrogen.

30. The article of claim 24, wherein the hydrosilation catalyst comprises platinum, ruthenium, rhodium, palladium, osmium, iridium, a complex thereof, or a mixture thereof.

31. The article of claim 24, wherein the inhibitor comprises an acetylenic alcohol, amine, di-alkenyl maleate, di-alkenyl fumarate, tetravinyltetramethylcyclotetrasiloxane, or a combination thereof.

32. The article of claim 20, wherein the hydrate inhibiting coating further comprises an antioxidant.

33. The article of claim 32, wherein the antioxidant is present in an amount between about 0.01 weight percent and about 5 weight percent based on the total weight of the hydrate inhibiting coating composition.

34. The article of claim 32, wherein the antioxidant comprises 2,2'-methylene-bis(4-methyl-6-tert-butylphenol).

35. An article comprising:
(a) a gas conduit defining a gas flow channel;
(b) an interior surface of the gas conduit;
(c) a hydrate inhibiting coating on the interior surface, wherein the coating comprises:
  (i) component A, a one- or two-part room temperature vulcanizable polyorganosiloxane composition comprising a surface-treated fumed silica, a condensation catalyst, and a crosslinking agent; and any reaction products thereof; and optionally (ii) component B, a hydrate release-enhancing proportion of at least one polyorganosiloxane comprising one or more silanol or alkoxy-silyl groups and comprising from about 10 weight percent to about 85 weight percent of at least one hydroxy-terminated or alkoxy-terminated polyoxyalkylenealkyl radical; and optionally (iii) any reaction products thereof.

* * * * *